United States Patent [19]

Hoffmann et al.

[11] 3,943,171

[45] Mar. 9, 1976

[54] METHOD OF PRODUCING ACRYLAMIDE WITH A RANEY COPPER CATALYST

[75] Inventors: Karl H. Hoffmann, Sauk Village; Donald R. Anderson, Oswego, both of Ill.

[73] Assignee: Nalco Chemical Company, Chicago, Ill.

[22] Filed: June 28, 1974

[21] Appl. No.: 484,176

Related U.S. Application Data

[63] Continuation-in-part of Ser. No. 473,182, May 24, 1974, abandoned, which is a continuation-in-part of Ser. No. 405,874, Oct. 12, 1973, abandoned.

[52] U.S. Cl............................ 260/561 N; 252/477 Q
[51] Int. Cl.²....................................... C07C 103/08
[58] Field of Search............... 260/561 N; 252/477 Q

[56] References Cited
UNITED STATES PATENTS

| 3,139,408 | 6/1964 | Tumer et al. | 252/477 Q |
| 3,235,513 | 2/1966 | Jung et al. | 252/477 Q |
| 3,560,404 | 2/1971 | Jung et al. | 252/477 Q |
| 3,686,307 | 8/1972 | Greene et al. | 260/561 N |
| 3,796,670 | 3/1974 | Pieters et al. | 252/477 Q |

*Primary Examiner*—C. Davis
*Attorney, Agent, or Firm*—Hill, Gross, Simpson, Van Santen, Steadman, Chiara & Simpson

[57] ABSTRACT

An improved process for making acrylamide from a composition of acrylonitrile and water utilizing an improved Raney copper catalyst. The catalyst is prepared by contacting particulate copper/aluminum alloy particles with an aqueous solution containing aliphatic hydrocarbon compound having at least two carbon atoms per molecule and further having at least two oxygen containing groups per molecule.

35 Claims, 5 Drawing Figures

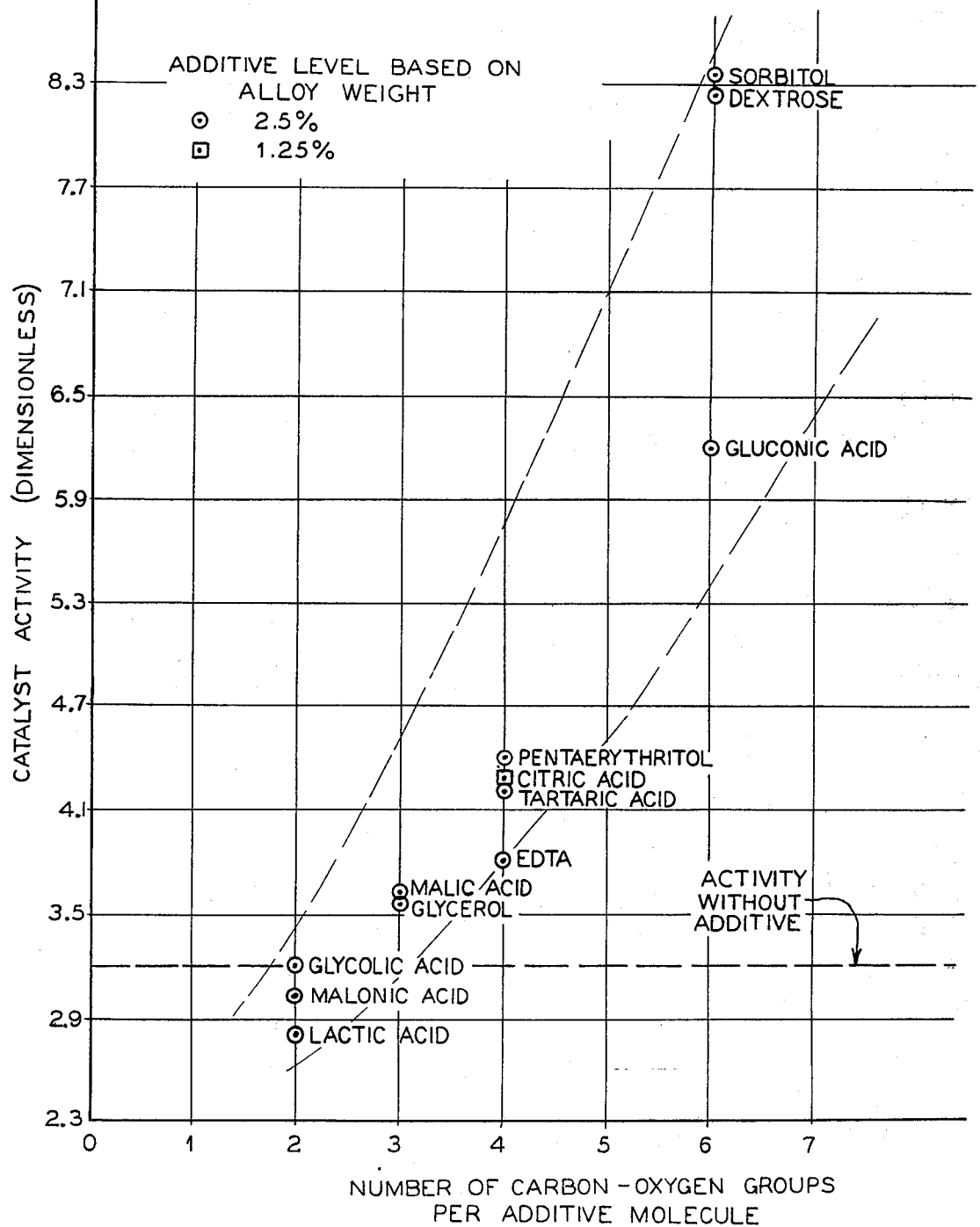

METHOD OF PRODUCING ACRYLAMIDE WITH A RANEY COPPER CATALYST

RELATED APPLICATION

This application is a continuation-in-part of our earlier filed U.S. application Ser. No. 473,182 filed May 24, 1974, which in turn is a continuation-in-part of our earlier filed U.S. application, Ser. No. 405,874, filed Oct. 12, 1973, both now abandoned.

BACKGROUND OF THE INVENTION

In the art of catalytically hydrolyzing acrylonitrile with water to acrylamide, various copper and copper containing catalysts have been proposed, such as mixtures of copper oxide with other metal oxides, reduced copper oxide/metal oxide mixtures, copper and copper/metal mixtures (see U.S. Pat. Nos. 3,597,481; 3,631,104; 3,642,894; and 3,642,643.) The use of Raney copper catalysts for this purpose is shown in German Pat. No. 2,036,126, German DOS No. 2,164,185 (1972), and Canadian Pat. No. 899,380 (1972). Based upon the method of catalyst preparation, it would appear that such prior art can be cataloged into two groups, one group involving the reduction of a copper containing compound or compounds, the other group involving the activation of a copper or copper alloy (such as Raney copper).

So far as can be determined, when using a Raney copper catalyst to hydrolyze acrylonitrile to acrylamide by the teachings of the prior art, it has been the practice to prepare or activate such catalyst by contacting such in a particulated form solely with aqueous caustic to dissolve away at least a portion of the aluminum after which the resulting activated product is kept under water or inert solvents to avoid oxidation. Apparently complete aluminum removal was heretofore sometimes believed to have been achieved and to be desirable for purposes of enhancing catalyst activity for this intended hydrolysis reaction; see, for example, the above referenced Canadian Pat. No. 839,384 at p. 5 where the Kawaken Fine Chemicals Co. Raney copper catalyst is used. According to Kawaken Fine Chemical Co. trade literature, it appears that substantially complete aluminum removal is achieved.

The art theorizes that Raney catalysts can contain amounts of insoluble aluminates which are sufficient to adversely affect catalyst activity and life for whatever reason, and the art has described efforts to remove such impurities; see, for examples, U.S. Pat. Nos. 2,673,189; 2,604,455; 2,950,260; and British Pat. Nos. 642,861 and 658,863. Apparently, no one has ever heretofore used a catalyst so prepared as to minimize the presence of alumina for catalytically hydrolyzing acrylonitrile to acrylamide under aqueous liquid phase conditions.

It has heretofore been proposed to activate Raney alloys for use as fuel cell electrodes by using in the activating solution alkali metal tartrates or lower aliphatic amino compounds; see U.S. Pat. No. 3,235,513. See also U.S. Pat. No. 3,067,276 for a discussion of catalyst regeneration. No one has ever heretofore prepared a Raney copper catalyst so activated in the presence of an additive and then used such a catalyst to catalytically convert acrylonitrile to acrylamide under aqueous liquid phase conditions.

Because of the limitations and short-comings observed for prior art Raney copper catalysts, the art continues to seek a Raney copper catalyst adapted for use in such hydrolysis reaction which has a high initial activity and a long activity life. In particular, the art desires such a catalyst which is particularly well suited for hydrolyzing acrylonitrile to acrylamide using a concentrated acrylonitrile/water feed and employing a rapid conversion rate while achieving a high conversion level.

BRIEF SUMMARY OF THE INVENTION

The present invention is directed to an improved catalytic process for making acrylamide from a starting composition comprising acrylonitrile and water. Typically, such a composition comprises from about 10 to 75 weight percent (preferably 30 to 40 weight percent) acrylonitrile with the remainder to 100 weight percent thereof being water. The process is conducted under liquid phase conditions using temperatures in the range from about 60° to 150°C., with temperatures of from about 70° to 125°C being presently preferred. Any convenient process conditions and procedure may be employed as those skilled in the art will appreciate.

The process involves contacting such a composition with a Raney copper catalyst. This catalyst is one which has been prepared by contacting particles of a metal alloy comprised of copper and aluminum with an aqueous solution which has dissolved therein on a 100 weight percent total solution basis from greater than 0 to about 25 weight percent alkali metal hydroxide and from greater than 0 to about 25 weight percent or the solubility limit thereof in water, whichever one thereof is lower, of at least one aliphatic hydroxylated hydrocarbon compound. The contacting is conducted at a temperature which is below 80°C. The aliphatic hydroxylated hydrocarbon compound has a total of at least two carbon atoms per molecule, and at least two groups per molecule each of which groups can itself contain carbon atoms and is indendently selected from the class consisting of:

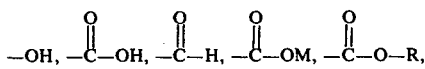

and lactones. Here M includes alkali metals and ammonium, and R is a lower alkyl group or a lower alkanol group. As used herein the term "lower" has reference to a molecule or group, as the case may be, which contains not more than six carbon atoms each. The term "lactone" is conventionally used to designated internal esters containing four, five, or six atoms in a ring structure. Preferably, the aliphatic hydroxylated hydrocarbon compound has a total of at least three carbon atoms per molecule, and at least three groups per molecule each of which groups is independently selected from the group just above indicated.

The catalyst so prepared characteristically and typically comprises from about 2 to 45 weight percent aluminum with the balance up to 100 weight percent being copper in any given catalyst. Minor quantities of other materials, such as oxygen, may be present. More preferably, such catalyst comprises, on a 100 weight percent total weight basis, from about 10 to 35 weight percent aluminum with the balance up to 100 weight percent thereof being copper. This catalyst characteristically and typically has an average particle size (diameter) in the range from about 0.001 to 0.5 inch, though larger and smaller particle sizes may be used if desired.

Because of the characteristically high initial catalytic activity, and also the characteristically long catalytic activity life, associated with the type of catalyst so prepared and used in the process of the invention wherein acrylonitrile is hydrolyzed with water to acrylamide, as indicated above, the present invention provides an improved process which can be operated continuously and for extended periods of time with the same catalyst to produce desired, economically significant, high conversion yields of acrylamide. The present invention is particularly useful when using starting compositions containing a high, or concentrated, acrylonitrile content.

In addition, the process of this invention offers operating efficiencies, and economies, particularly in fixed catalyst bed, continuous operation, which are believed to be greater than heretofore known in this art.

The present invention provides an improved technique for activating a Raney copper catalyst in a process for hydrolyzing acrylonitrile to acrylamide under aqueous liquid phase conditions.

Further, the present invention aims to provide a Raney copper catalyst which permits one to hydrolyze acrylontrile to acrylamide under liquid phase conditions and achieve a high initial activity together with a longer catalyst life than has heretofore been possible in the hydrolysis reaction of acrylontrile to acrylamide.

Other and further aims, objects, purposes, advantages, utilities, and features will be apparent to those skilled in the art from a reading of the present specification and drawings.

BRIEF DESCRIPTION OF THE DRAWINGS

In the drawings:

FIG. 5 is a plot illustrating the effect of additives such as used in Raney copper catalyst activation by this invention upon Raney copper catalyst activity in acrylonitrile hydrolysis to acrylamide.

DETAILED DESCRIPTION

Figure 1:
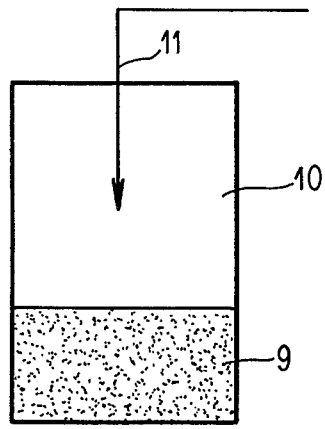
FIG. 1 is a diagrammatic representation of one mode of preparing a catalyst suitable for the process of the present invention.

The catalyst used in the practice of the present invention is a Raney copper catalyst which has been activated through contact with a composition containing dissolved alkali metal hydroxide and dissolved aliphatic hydroxylated hydrocarbon compound. The starting material is preformed, binary metal alloy comprised of aluminum and copper in particulate form which contains a weight percent ratio of Al/Cu in the range from about 70:30 to 30:70 (preferably about 45:55 to 55:45, and most preferably about 50:50).

In general, in this invention, no particular special conditions need be employed when contacting starting alloy particles with an aqueous solution of alkali metal hydroxide and aliphatic hydroxylated hydrocarbon compound. Typically, the alloy starting material is as indicated in the form of particles ranging in size from about 0.001 to 0.5 inch. Preferably, this solution comprises from greater than 0 to about 15 weight percent alkali metal hydroxide, from greater than 0 to about 5 weight percent aliphatic hydroxylated hydrocarbon compound, and with the balance up to 100 weight percent thereof being water (total composition basis).

More preferably, such a solution comprises from greater than 0 to about 5 weight percent alkali metal hydroxide, from about 0.01 to about 1.0 weight percent aliphatic hydroxylated hydrocarbon compound, and with the balance up to 100 weight percent thereof (total basis) being water. Preferably, the process of contacting with such a solution is conducted while maintaining the reaction zone in the region of the particles being activated into Raney copper catalyst at a temperature in the range of from about 0° to 80°C. Preferably, the contacting time ranges from about ½ to 30 hours. More preferably, the contacting temperature is in the range of from about 30° to 60°C. More preferably, the contacting time is adjusted to be in the range from about 4 to 12 hours.

The Raney copper catalyst should have at least about 25 weight percent of the initially present aluminum in such alloy particles is removed during alkali contacting; however, it is apparently not necessary to remove aluminum from a catalyst during activation thereof by contacting such with a mixed solution of alkali metal hydroxide and aliphatic hydroxylated hydrocarbon compound as taught by this invention.

In one preferred and exemplary plant operational mode of catalyst preparation, activation of such starting alloy is accomplished by first contacting an aqueous solution of at least one aliphatic hydroxylated hydrocarbon compound with a group of such alloy particles. This aqueous solution can contain dissolved therein an amount as indicated above, though preferably from about 0.01 to 1.0 weight percent of aliphatic hydroxylated hydrocarbon compound, total solution basis. Conveniently, the particles are preferably initially immersed in water and the aliphatic hydroxylated hydrocarbon compound(s) is (are) added to such water of immersion until the desired concentration of such compound(s) is obtained. Such alloy particle group has an average particle size (diameter) in the range from about 0.001 to 0.5 inch, and such copper alloy preferably has a copper to aluminum weight ratio of from about 45:55 to 55:45. This aqueous solution preferably has a temperature in the range from about 30° to 60°C during such contacting. The time of such first contacting is relatively unimportant, though times of from about 5 minutes up to several hours has been found to be convenient.

Secondly, one contacts the resulting said group of alloy particles with an aqueous caustic (alkali metal hydroxide) solution. Conveniently, the caustic (alkali metal hydroxide) is added to (and dissolved in) the previously utilized solution of aliphatic hydroxylated hydrocarbon compound(s) while continuous contact of such solution with such particles is maintained. Such second contacting is accomplished over a total time interval of from about ½ to 30 hours (preferably about 4 to 12 hours), and such caustic solution may be added gradually to said group over said time interval continuously or incrementally. The contact rate or addition rate of starting caustic solution being added to said group of particles during such contacting typically ranges from about 0.01 to 10 pounds caustic per pound of said starting group of alloy particles per hour (dry weight basis). The total quantity of caustic so added to the aqueous medium in the reaction zone is typically in the range of from about 0.5 to 25 pounds of caustic per pound of said starting group of particles (dry weight basis). During such contacting, such aqueous caustic solution and the resulting aqueous medium produced in such contacting each have a temperature in the range of from about 0° to 80°C, but temperatures below about 60° are preferred. During such second contacting, said group of particles is thus maintained in contact with at least one aliphatic hydroxylated hydrocarbon compound. Preferably at least about 25 weight percent (total starting weight basis) of this aluminum initially present is removed during such a contacting operation conducted in accord with the teachings of this invention during the course of such an initial catalyst operation using fresh starting alloy particles.

While some alkali metal hydroxide during the contacting characteristically reacts with the aluminum of the alloy particles, the manner in which an aliphatic hydroxylated hydrocarbon compound functions in the practice of the present invention is presently unknown. One theory (and there is no intent herein to be bound the theory) is that this material functions as a sequestering or stabilizing agent which prevents the precipitation of solid particles of alumina (or derivatives) on the surface or in the pores of the catalyst being actuated, a theory which may be supported by U.S. Pat. No. 2,345,134 where polyhydroxylated compounds apparently act as stabilizing agents for sodium aluminate.

After such second contacting, the resulting group of Raney copper catalyst particles is preferably washed to separate therefrom any remaining aliphatic hydroxylated hydrocarbon compound, the remaining unreacted caustic and aluminate. Thereafter, the so-washed group of particles may optionally interveningly be stored before being used in the hydrolysis porcess of this invention.

This hydrolysis process preferably involves contacting such particles of Raney copper catalyst with an aqueous composition comprising, for example, from about 30 to 40 weight percent acrylonitrile with the remainder to 100 weight percent thereof being water while maintaining a temperature of, for example, from about 70° to 125°C, as indicated.

One preferred group of aliphatic hydroxylated hydrocarbon compounds comprise polyhydroxylated aliphatic carboxylic acids. One class of such acids suitable for use in the present invention is characterized by the formula:

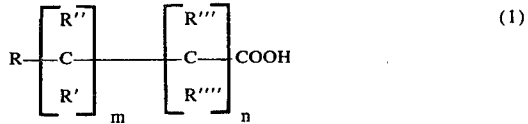

where:

R,R', R'', R''' and R'''' are each independently H, lower alkyl, —OH, or —COOH provided that at least one of R, R', R'', R''' and R'''' is hydroxyl and that at least one other of such R, R', R'', R''' and R'''' groups is either carboxyl or hydroxyl, $n$ is an integer of from 2 through 8 inclusive (4 through 8 being prefererd), and $m$ is an integer of from 0 through 4 inclusive, It will be readily appreciated by those skilled in the art that one can employ, in place of, or in addition to, those compounds of formula 1, carboxylate salts (such as alkali metal salts and ammonium salts) and carboxylate esters (such as lactones and esters with lower aliphatic alcohols) which will, in alkaline water solution, form the same anions as do the compounds of formula 1.

Examples of particular compounds within the scope of formula 1 include: gluconic acid, glucaric acid, saccharinic acid, and the like.

One more preferred class of hydroxylated hydrocarbon compounds partially within the scope of formula (1) above is characterized by the formula:

$$R—(CHOH)_n—COOH \qquad (2)$$

where:

R is selected from the group consisting of —CH$_3$, —CH$_2$OH, —COOH, —CHO, and —H, and $n$ is an integer of from 1 through 5.

Examples of particular compounds within the scope of formula (2) include gluconic acid, glucaric acid, tartaric acid, d-glucuronic acid, and the like. The alkali metal and ammonium salts of acids of compounds of formula 2 are also preferred.

Thus, examples of compounds suitable for use as additives during contacting in accord with the teachings of this invention which are similar to compounds within the scope of formula (1) or of formula (2) include alkali metal salts (sodium being presently preferred) of gluconic acid, tartaric acid, or citric acid, lactones, such as glucono-8-lactone, and the like.

Another class of aliphatic hydroxylated hydrocarbon compounds includes aliphatic polyhydroxylated compounds with at least two carbon atoms and at least two hydroxyl groups per molecule. Such compounds can include as many as 12 to 15 carbon atoms in a given molecule. Examples include pentaerythritol, glycerol, and the like.

A more preferred class of such aliphatic polyhydroxylated hydrocarbon compounds suitable for use with caustic in activating Raney copper catalysts for use in the practice of the present invention is characterized by the formula:

$$H—(CHOH)_n — CH_2OH \qquad (3)$$

where $n$ is an integer of from 3 through 8.

Examples of formula 3 compounds include sorbitol, mannitol, and the like.

Another class of aliphatic hydroxylated hydrocarbon compounds suitable for use in the practice of the present invention for activating Raney copper catalysts with caustic includes saccharides (including mono, di, and polysaccharides and glycosides).

The terms "saccharide" and "glycoside" are used herein in their conventional, contemporary meanings, as those skilled in the art will appreciate.

Thus, briefly, monosaccharide can be regarded as being a compound of the formula:

$$(CH_2O)_x \qquad (1)$$

where $x$ is an integer which can vary from 2 through 6. In this formula (1), the carbon atoms are bonded to one another in an unbranched, continuous chain. In the open, straight chain form or representation, one carbon atom (called the anomeric carbon atom) in each molecule has a carboxyl group which can be either an aldehyde or a ketone. All carbon atoms other than the anomeric carbon atom in each molecule have a single hydroxyl group attached thereto. In the ring form or representation, the monosaccharides of the above formula (1) where $x$ is 5 or 6 can also exist in the pyranoside or furanoside form in which the anomeric carbon atom interacts with the hydroxyl group on a carbon atom in the molecule to form a ring structure. The cyclic form is either a hemiacetal or a hemiketal structure around the anomeric carbon atom.

The glycosides can be regarded as being formed between a monosaccharide of the type wherein $x$ equals 5 or 6 in the above formula (1) and a lower alkanol. The term "lower" as used herein has reference to a molecule or radical containing less than 6 carbon atoms each. The hydroxyl group on the anomeric carbon atom of the monosaccharide reacts with the hydroxyl group on the lower alkanol to split out water and form an oxygen bond so that the two molecules are linked together through an oxygen atom.

A disaccharide is a glycoside with is formed between two monosaccharides in which the hydroxyl group on the anomeric carbon atom of one of the monosaccharide molecules has a reaction with one hydroxyl group on the other monosaccharide molecule.

A polysaccharide can be regarded as comprised of more than two monosaccharide units similarly interconnected together through oxygen atoms to form a chain of three or more monosaccharides. Thus, the oxygen atom, which is the linking atom between adjoining ring structures is bonded to an anomeric carbon atom of one of such ring structures.

Examples include glucose, sucrose, corn starch, arabinose, and the like. Preferred aliphatic hydroxylated hydrocarbon compounds are substantially completely water soluble at the concentrations employed in the usual practice of this invention.

Presently most preferred aliphatic hydroxylated hydrocarbon compounds include gluconic acid (and compounds which produce the gluconate ion in alkaline water solution, such as sodium gluconate, glucono-δ-lactone, and the like) sorbitol, and glucose (dextrose). A presently most preferred alkali metal hydroxide is sodium hydroxide.

One class of aliphatic hydroxylated hydrocarbon compounds to be regarded as included within the scope of additives employed herein comprises heterocyclic compounds wherein the heterocyclic ring contains 1, 2 or 3 oxygen atoms. The pyron ring is illustrated by pyronosides, and the furan ring is illustrated by furanosides, for example. Compounds containing the dioxane ring or the sym-trioxane ring, for example, or compounds containing an acrylic ring, may be used, other criteria being met as explained hereinabove.

In general, aliphatic hydroxylated hydrocarbon compounds used in this invention each have a molecular weight below about 1000, and preferably not more than about 500, and, if a repeating unit is involved, no compound is more than a dimer or a trimer.

The exact amount of additive material used in a given catalyst activation performed in accord with the teachings of this invention can vary over relatively wide ranges as indicated. When a catalyst activation procedure using a particular additive material is being optimized so as to produce, for example, a catalyst having maximized initial activity, it can be borne in mind that apparently each additive has its own particular optimized concentration level above which further increases thereof may result in no substantial further increase in product activated catalyst activity, as data presently available suggests. Indeed, at relatively high concentrations, at least some additive materials may cause side reactions or other (presently unknown) effects to occur which exert an adverse influence upon a given activation procedure. Thus, as those skilled in the art will appreciate, it is practically impossible to express for each additive a broad usable range or an optimized use range. In general, lower as opposed to high concentrations of an additive material are preferred for reasons of economy and general effectiveness in commercial activation procedures, although ethylene glycol, for example, presently appears to be an exception to this last guide.

Those skilled in the art will readily appreciate that any convenient procedure or technique may be employed for contacting starting copper/aluminum alloy particles with an aqueous mixture of alkali metal hydroxide and aliphatic hydroxylated hydrocarbon compound. The starting alloy particles can be added to a starting mixture composition, or vice versa, or otherwise as desired. While pretreatment of particles of alloy with a starting mixture comprising an aqueous solution of aliphatic hydroxylated hydrocarbon compound is more convenient, such is not necessary. A performed Raney copper catalyst conventionally prepared by alkali contact can be post treated, if desired, with a starting solution comprised of alkali metal hydroxide and aliphatic hydroxylated hydrocarbon compound in accord with the teachings of this invention particularly when optimized catalyst performance is not needed. It is preferred to activate a catalyst as taught herein for use in this invention under conditions such that the metal particles are subjected to a minimum of heat exposure, such as is generated when, for example, concentrated aqueous alkali metal hydroxide contacts the starting alloy particles. It is preferred to activate a catalyst as taught herein for use in this invention using temperatures which do not exceed about 80° C., and by using controlled incremental or continuous addition of alkali metal hydroxide over an extended time period to an aqueous medium being used to activate a group of particles.

One can conveniently employ during catalyst activation a total quantity of aqueous hydroxide, for example, such that the molar quantity of hydroxide used totals from about 0.25 to 2.01, preferably 1.1 to 2.0 times the total molar amount of aluminum initially present in a starting group of alloy particles, as when a batch preparation procedure is being employed, where the aqueous hydroxide is being added to a vessel containing a fixed quantity of starting alloy with aqueous aliphatic hydroxylated hydrocarbon compound and the aqueous hydroxide leaching composition being allowed to accumulate in this vessel during the leaching operation. Particles previously contacted with an alkali metal hydroxide solution may advantageously be post-contacted with an aqueous solution of aliphatic hydroxylated hydrocarbon compound using concentrations as taught herein.

During the contacting of starting alloy with such a leaching composition, an aluminate (in solution) and hydrogen gas are characteristically produced. Conveniently the hydrogen gas is vented more or less at the rate generated from the reaction zone, and most of the aluminate may be removed in the water of the leaching composition, if desired. It is preferred to conduct the activation operation under inert conditions, such as under a blanket of nitrogen gas or a gas of helium family, primarily to avoid forming explosure mixtures of hydrogen and oxygen.

At the end of a contacting operation by the teachings of this invention, the resulting solid catalyst particles remaining are preferably washed with water preferably to a neutral pH (e.g. a pH in the range of from about 7.0 to 7.5). The product catalyst is then removed from the reaction zone, and wet screened to separate fines, preferably.

The product catalyst is conveniently stored under water, as in drums, prior to charging to a reactor for use in the practice of the process of the present invention. Keeping the catalyst under water prevents oxidation by air which occurs rapidly if the catalyst is allowed to have oxygen exposure.

The hydrolysis reaction of this invention proceeds even when the amount of the catalyst prepared as described herein is very slight. For example, addition of such catalyst in an amount of 0.01 gram per mole of acrylonitrile is sufficient to make the reaction proceed. The greater the amount of catalyst used, the faster the reaction proceeds, in general, thus permitting an increase in the amount of acrylamide produced. Consequently, the amount of catalyst employed per mole of acrylonitrile initially employed can preferably range from about 0.01 to 100 grams, although more catalyst can be used, if desired.

Acrylamide may be made from the mixture of acrylonitrile and water in accordance with the present invention using a suspension bed or a fixed bed of catalyst. Combinations thereof may be employed. Two or more reactors may be connected in series and the reaction liquid and the catalyst, as when a suspension bed system is employed, may be counter-currently moved to effect and enhance reaction.

The hydrolysis process of this invention may be practiced under atmospheric pressures, but the process may also be practiced at superatmospheric and subatmospheric pressures. Batch processing may be used, but continuous is preferred. Superatmospheric pressures help keep a liquid phase during processing.

When practicing the process of the present invention using such a Raney copper catalyst prepared as described herein and utilizing a suspension bed system, it is preferred to employ the Raney copper catalyst in the form of particles at least 90 weight percent of which are in an average size range from about 0.002 to 0.100 inch. Similarly, when the present invention is practiced using such a Raney copper catalyst in the form of a fixed bed system, it is convenient and preferred to use the Raney copper catalyst in the form of particles at least 90 weight percent of which range in average size from about 0.02 to 0.50 inch.

In one more preferred catalyst preparation procedure, using the preferred route above described, the said group of alloy particles is confined to a reaction zone. A caustic solution and a solution of aliphatic hydroxylated hydrocarbon compound may be admixed and contacted with said group of particles in said zone, but the resulting aqueous medium is gradually removed from said zone during the contacting. In another more preferred catalyst preparation procedure, using the preferred route above described, the said resulting aqueous medium is so removed at a volumetric rate which is about equal to the rate of addition of said caustic solution. In such a removal procedure, substantially 100 weight percent of this so removed resulting aqueous medium can be recycled back into contact with the group of particles being activated. During such a recycle, the so recycled aqueous medium is admixed with at least a portion of fresh caustic solution before or during recycle contact with such a group of particles.

Alternatively, less than 100 weight percent of said so removed resulting aqueous medium can be recycled back into contact with said group of particles. The balance up to 100 weight percent thereof is permanently removed from said reaction zone and can be discarded. Caustic may be added to such reaction zone at a rate approximately equal to the rate at which caustic is consumed through reaction with the aluminum in the alloy. The contacting process involving caustic addition may preferably be practiced continuously at a rate which is approximately equal to the rate of caustic consumption. The amount of aluminum left in the catalyst after an activation, as described herein, can vary widely, but in the case of an active catalyst used for fixed bed catalysis, it has been found that as much as 20 weight percent aluminum (based on total catalyst weight) can be present in a catalyst without apparently affecting catalyst use and performance characteristics, such as conversion rate, throughout rate of reactants, catalyst life, catalyst activity, etc., a fact which is somewhat surprising in view of the prior art above reviewed.

In preparing a catalyst for use in this invention, it will be appreciated that there apparently is a sensitive relationship between the temperature of activation and the time of caustic contact with starting alloy. In general, the higher the temperature, the longer should be the time for caustic addition to provide an active catalyst, because under such conditions localized overheating of the catalyst particles is avoided or reduced to a minimum level. Localized overheating of alloy particles may interfere with generation of a catalyst having an optimum desired group of characteristics associated therewith for use in the hydrolysis reaction constituting the process of the present invention. If one employs a rapid reaction between alloy particles and alkali, there tends to be produced a lessening of catalyst activity. A surprising amount of heat is liberated when one contacts alloy particles with caustic so that, on a large scale of catalyst activation, refrigeration equipment could be used to remove the exotherm.

As used herein the term "gradual" includes not only continuous but also intermittent addition of alkali to alloy particles or removal of a resulting aqueous medium from the zone of a given activation reaction.

Even after a great portion of removable aluminum in particles has been etched away by caustic, as in a conventional Raney copper catalyst activation procedure, one can still obtain a benefit (improved catalyst activity in the hydrolysis process of this invention) by contacting such particles with a solution of alkali metal hydroxide and aliphatic hydroxylated hydrocarbon compound in accord with the teachings of this invention. Hence, a starting alloy material in particulate form for purposes of this invention can be one which has previously undergone a contacting with alkali metal hydroxide using, for example, prior art Raney copper catalyst activation technology. The beneficial results achieved by a contacting conducted in accord with this invention are characteristically producible even when using an aqueous treating or contacting medium wherein the concentration of alkali metal hydroxide, and aliphatic hydroxylated hydrocarbon compound, respectively, is very low. Though as those skilled in the art will appreciate one can employ, as taught herein relatively high such concentrations, low such concentrations are preferred, during a contacting operation as taught herein. Mixtures of different ones of the additives taught herein may sometimes be advantageously employed during contacting.

Referring to FIGS. 1 through 4, there are seen four equipment configurations, each one of which can be used to treat a group of starting alloy particles with aqueous aliphatic hydroxylated hydrocarbon and with aqueous alkali metal hydroxide to produce a desired activated Raney copper catalyst for use in the present invention. Thus, in FIG. 1 there is seen an equipment configuration where a group of particles 9 are confined to a reaction zone 10 and a caustic solution is added into the zone 10. The liquid added into zone 10 through pipe 11 is allowed to accumulate in the zone 10. At the end of the caustic addition, in accordance with the preferred catalyst activation procedure of the present invention, and after caustic addition is terminated, the resulting treated particles 9 are removed from zone 10 as taught above. The particles 9 may be either initially wet with water or substantially free from water before alkali metal hydroxide addition is commenced. In one preferred mode, the particles 9 are immersed in water.

Figure 2:
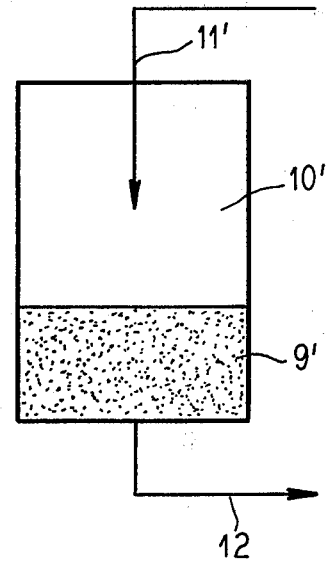
FIGS. 2 through 4 each show representations similar to that of FIG. 1 but illustrating second, third and fourth modes, respectively, of catalyst preparation.

In FIG. 2 is shown a system similar to FIG. 1; corresponding parts thereof are similarly numbered, but with the addition of prime marks thereto. The system of FIG. 2 is equipped with a drain arrangement 12 which permits one to remove gradually from the vicinity of the group of particles 9 the medium which results after the alkali metal hydroxide solution and the aliphatic hydroxylated hydrocarbon have each been brought into contact with the group of particles 9. Preferably, the resulting aqueous medium is so removed at a volumetric rate which is about equal to the rate of addition of the starting alkali metal hydroxide solution and aqueous hydroxylated hydrocarbon.

Figure 3:
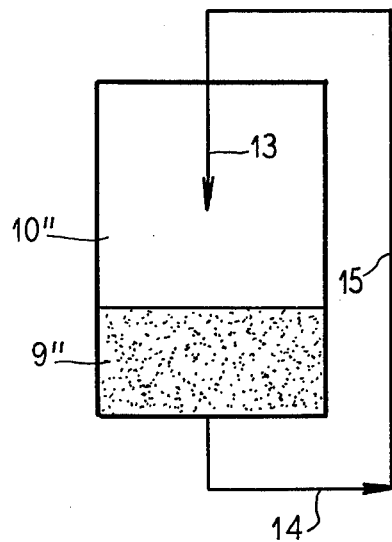

In FIG. 3 is shown another system in which the parts similar to those of FIG. 1 are similarly numbered but with the addition of double prime marks thereto. Here, alkali metal hydroxide solution and the aliphatic hydroxylated hydrocarbon are each gradually added into reaction zone 10″ through a conduit 13. After the alkali metal hydroxide solution from conduit 13 has contacted the group of particles 9″, the resulting aqueous medium is gradually removed through conduit 14. In conduit 14 this resulting aqueous medium is conveyed to a connection region 15 where conduit 14 is interconnected with a conduit 16. Fresh alkali metal hydroxide solution and fresh aliphatic hydroxylated hydrocarbon compound are each conveyed through conduit 16 and is mixed with the aqueous medium in conduit 14 in the region of connection 15 so that a mixture of the aqueous medium and fresh alkali metal hydroxide solution and fresh aliphatic hydroxylated hydrocarbon compound results, which mixture is then conveyed through conduit 13 back into the reaction zone 10″, as shown. Such a system as shown in FIG. 3 permits economical use of alkali metal hydroxide, as those skilled in the art will appreciate.

Figure 4:
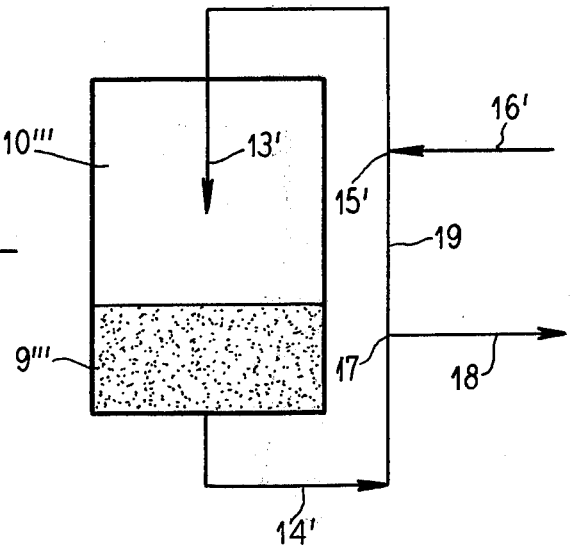

In FIG. 4 is shown another system in which the parts similar to those of FIG. 1 are similarly numbered but with the addition of triple prime marks thereto. Here alkali metal hydroxide solution and aliphatic hydroxylated hydrocarbon compound are gradually added into the reaction zone 10‴ through a conduit 13′. After the alkali metal hydroxide solutation and aliphatic hydroxylated hydrocarbon from conduit 13′ has contacted the group of particles 9‴, the resulting aqueous medium is gradually removed through a conduit 14′ in conduit 14, this resulting aqueous medium is conveyed to a connection 17. At connection 17 a portion of the resulting medium is removed through a conduit 18, affluent from conduit 18 may be discarded or otherwise disposed safely if desired. The term portion here has reference to any fraction of the resulting medium ranging from greater than 0 to less than 100 weight percent or volume percent thereof. That portion of the resulting medium which is not removed from conduit 18 is conveyed by conduit 19 to connection region 15′, where conduit 19′ is connected with a conduit 16′. Fresh alkali metal hydroxide solution and fresh aliphatic hydroxylated hydrocarbon are conveyed through conduit 16′ and is mixed with the aqueous medium in conduit 19 in the region of connection 15′ so that a mixture of the aqueous medium and fresh alkali metal hydroxide solution results, which mixture is then conveyed through conduit 13′ back into the reaction zone 10‴, as shown. Such a system as shown in FIG. 4 permits economical use of alkali metal hydroxide and in addition permits one selectively to remove spent alkali metal hydroxide and accumulated aluminate salts from the system during catalyst activation, as those skilled in the art will appreciate.

In each of the systems of FIGS. 2, 3, and 4, the group of particles 9′, 9″, or 9‴, respectively, may be either initially wet with water or substantially free from water, and in one preferred mode such respective groups of particles 9′, 9″, or 9‴, is immersed in water initially. As those skilled in the art will appreciate the representations in FIGS. 1 through 4 are in no way to be considered as limiting the actual conduit arrangement, method of alkali metal hydroxide addition or resulting medium removal, equipment orientation, or the like. Thus, for example, while for simplicity, gravitational type systems are shown in FIGS. 1 through 4, a system based on horizontal flow or vertical flow can be employed if desired, or some combination of flow directions of fluid over alloy particles during catalyst activation. In these FIGS. 1 through 4, those skilled in the art will readily appreciate that vent means for hydrogen evolved during activation is conveniently provided. Also, those skilled in the art will readily appreciate that actual plant equipment may involve more than one unit for a given zone indicated in FIGS. 1 through 4.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

Activation of alloy to Raney copper catalyst

A leaching reaction to activate a 50:50 weight ratio copper aluminum alloy is carried out using an apparatus arrangement as illustrated in FIG. 1. The alloy, which is in the form of particles ranging in size from about 0.06 to 0.25 inch average diameter size, is placed in a wire basket which is rotated in a 1 to 3 liter reaction flask. The flask is provided with a nitrogen purge inlet, a buret for caustic addition, a thermometer and a hydrogen outlet connected to a Wet Test Meter. Circulation of the leaching solution is accomplished by using a turbo-agitator in the flask beneath the basket.

After the alloy is placed in the basket mounted in the reactor flask, sufficient deionized water is added to the flask to completely immerse all particles and the agitator is set for about 120 r.p.m. Heating to a reaction temperature of 105°F is undertaken concurrently with a 30 minute nitrogen purge. Prior to the addition of the caustic solution an aqueous solution of gluconic acid, 50% by weight at ambient temperature, is added to the water. The resulting aqueous solution of gluconic acid is estimated to contain from about 0.1 to 0.3 weight percent gluconic acid. The total amount of acid thus added is about 0.01 grams of acid per gram of alloy, on a dry basis.

When the flask reaches 105°F and the purge is completed, a 50 weight percent sodium hydroxide solution is added continuously over a 380 minute period to the system until 3 pounds of sodium hydroxide solution per pound of alloy have added, while controlling the temperature within ± 2°F with external cooling.

Contacting with the sodium hydroxide solution is continued until an estimated amount of about 80 to 90 weight percent of the total aluminum present in the starting alloy has been leached, based on hydrogen evolution. The reaction rate is evaluated by monitoring the hydrogen evolution every 15 to 30 minutes. Thereafter, the product catalyst is immediately removed from the leaching solution and placed into a large excess of deionized water. The product catalyst is rinsed with deionized water until the pH of the rinse water approaches 7.0 after which the product catalyst is stored under deionized water to prevent oxidation thereof.

EXAMPLE 2

Activation of alloy to Raney copper catalyst

A leaching reaction using an apparatus arrangement as illustrated in FIG. 2 to activate a 50:50 weight ratio copper aluminum alloy is performed using a ½ inch outside diameter semi-batch fixed bed reactor. The reactor is provided with a nitrogen purge inlet, a buret for caustic addition, a thermometer, and a hydrogen outlet connected to a Wet Test Meter.

At the bottom of the reactor a 3 to 4 inch bed of 4 mm glass beads are initially placed, and on top of this bed is positioned a charge of starting alloy, which is in the form of particles ranging from about 0.06 to 0.25 inch average diameter. A second bed of similar bead thickness is then placed on top of the alloy charge in the reactor. Then deionized water at ambient temperature is circulated through the bed while the reactor is being heated to 105°F. Immediately after heating is commenced, an aqueous solution of 50 weight percent gluconic acid at ambient temperature is added to the circulating water solution at a level sufficient to produce a ratio of 0.001 grams gluconic acid per gram of alloy in the reactor; such addition is continued during this entire activation procedure during subsequent caustic solution addition to the reactor.

Circulation of the leaching solution is accomplished by pumping a 1% caustic solution (dry basis) at a rate of 0.1 grams caustic per gram alloy per hour and allowing the results aqueous medium to be removed from the reactor at a rate approximating the pumping rate. A liquid level, sufficient to immerse the alloy and resulting catalyst, is maintained during the activation with a liquid leg device so that greater heat transfer capabilities may be obtained.

When the unit reaches 105°F, the caustic solution, containing added gluconic acid in solution at a concentration estimated to be from 0.01 to 0.03 weight percent, is added until a total charge of about 3 grams of caustic per gram of alloy has been contacted with the alloy. The circulation rate is thus about 10 grams resulting solution per gram of alloy particles per hour. The reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 3

Activation of alloy to Raney copper catalyst

A leaching reaction using an apparatus arrangement as illustrated in FIG. 3 to activate a 50:50 weight ratio copper aluminum alloy is performed using a ½ inch outside diameter semi-batch fixed bed reactor. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the fixed bed reactor.

At the bottom of the reactor a 3 to 4 inch bed of 4 mm glass beads are placed on top of which is positioned a charge of starting alloy, which is in the form of particles ranging from about 0.06 to 0.25 inch average diameter. A second bed of similar bead thickness is placed on top of the alloy charge in the reactor. Thereafter, deionized water is circulated through the bed while the reactor is being heated to 105°F. Thereafter an aqueous solution of 50 weight percent gluconic acid at ambient temperature is added to the water in a quantity to provide about 0.01 grams of gluconic acid per gram of alloy. The resulting aqueous gluconic acid concentration is estimated to be from 0.1 to 0.3 weight percent.

When the unit reaches 105°F, a 50 weight percent sodium hydroxide solution is begun to be added at a rate of about 0.2 grams sodium hydroxide per gram of alloy per hour until a total charge of about 3.0 grams of such sodium hydroxide solution have been added per gram of alloy. Using a medium circulation rate similar to that employed in Example 2, the reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 4

Activation of alloy to Raney copper catalyst

A leaching reaction using an apparatus arrangement as illustrated in FIG. 4 to activate a 50:50 weight ratio copper aluminum alloy is performed using a ½ inch outside diameter semi-batch fixed bed reactor. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the bed reactor.

At the bottom of the reactor a 3 to 4 inch bed of 4 mm glass beads are placed on top of which is positioned a charge of starting alloy, which is in the form of particles ranging from about 0.06 to 0.25 inch average diameter. A second bed of similar bead thickness is placed on top of the alloy charge in the reactor. Thereafter deionized water at ambient temperature is circulated through the bed while the reactor is being heated to 105°F. Immediately after heating is commenced an aqueous solution of 50 weight percent gluconic acid solution is added at ambient temperature to the water in a quantity to provide about 0.01 grams of gluconic acid per gram of alloy. The resulting aqueous gluconic acid concentration is estimated to be from 0.1 to 0.3 weight percent. When the unit reaches 105°F, a 50 weight percent sodium hydroxide solution containing added gluconic acid in solution at a concentration estimated to be from 0.01 to 0.03 weight percent, is added at a rate of 0.2 grams of sodium hydroxide solution per gram of alloy per hour until a total charge of about 3.0 grams of such sodium hydroxide solution have been added per gram of alloy. A circulation rate similar to that of Example 2 is employed. During such sodium hydroxide addition, a portion of the resulting aqueous medium is removed from the system at a rate of 0.25 grams per hour per gram of alloy.

The reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 5

Hydrolysis Process

The catalyst prepared according to the procedure of Example 1 is packed into a 12 inch continuous acrylonitrile hydrolysis reactor so as to form a fixed catalyst bed therein, the catalyst being covered with water during the charging operation to avoid oxidizing same. The reactor is sealed and pressure checked.

Water at the rate of 3.7 ml per minute and acrylonitrile at the rate of 1.5 ml per minute are charged to the reactor and the reactor temperature is raised to 175°F. When the reactor reaches 175°F and the flow rates are lined out, a 1 hour conditioning period is undertaken to insure that the system is equilibrated. A test is then started and a composite sample of the product stream is taken after 60 minutes followed by a second composite sample at the end of the next 30 minutes to check for possible variations.

Thereafter the water feed rate is reset to 2.65 ml per minute and the acrylonitrile feed rate is reset to 1.1 ml per minute. The unit is allowed to equilibrate for 30 minutes, and then a sample of the product is taken in the same manner as done previously.

The samples are submitted to gas chromatographic analysis for determination of water, acrylamide, and acrylonitrile content. Samples that are two phased are dissolved in methanol to yield a single phase sample for this analysis. The shut-down procedure requires cooling the reactor, terminating the nitrile feed, and flushing the reactor with water to remove any residual nitrile.

The catalyst evaluated in this procedure is compared with other catalysts produced using the process of Example 1 with modifications as shown in Table 1. Evaluation of the catalysts provided information relating the relative activity of catalysts to the process condition under which the catalyst is prepared. The aforementioned relative activity is based on the concept that under a specific set of reactor operating conditions, e.g., temperature, feed contact time, acrylonitrile concentration in the feed, the same conversion level of acrylonitrile to acrylamide is obtained by varying the weight of catalyst present in the reaction zone. The ratio of the weight of catalyst required, to obtain the same conversion level of acrylonitrile to acrylamide as obtained with the catalyst assigned an activity of 1.0, to the weight of catalyst having an activity of 1.0, is the reciprocal of the catalyst activity. To illustrate, if the catalyst to obtain a conversion level of acrylonitrile to acrylamide of about 80% and a second catalyst requires 25 grams of catalyst to effect the same conversion of acrylonitrile to acrylamide of about 80%, then the reciprocal of the relative activity of the latter catalyst is 25 grams/50 grams = 0.5, and thus the relative activity is 1/0.5 = 2.0. Use of this analysis under the operating conditions described in this example provides the relative activity value of catalysts produced under various operating conditions using the activation process of Example 1. The results are summarized below in Table 1. The aforementioned relative activity is measured by the procedure described in Example 8 (parts a–n). When each of the catalysts prepared by the teachings of Examples 2, 3 and 4 is used in the hydrolysis reaction in the manner just described, similar results are obtained. The information contained in Table 1 demonstrates the vast difference in generating a catalyst as defined in this invention when compared to a catalyst activated by the method thereinabove referred to as the Kawaken method. It is evident to those familiar with the art that the relative activity of a catalyst activated by the method claimed in this invention is significantly more active, i.e., by a factor of 4 to 7 times as active, as a catalyst prepared by the Kawaken method.

TABLE 1

| CATALYST | | CATALYST ACTIVATION CONDITIONS | | | | | CATALYST ACTIVITY |
|---|---|---|---|---|---|---|---|
| Catalyst | Tyler Sieve size range | Activation Temperature | % NaOH (4) | NaOH addition time (3) | grams Gluconic acid per 100 grams of alloy | Comments (5) | relative to the standard basis - dimension less |
| a | 6–8 mesh | 85°F | 20% | 0 | 0 | Prepare catalyst using method described by Kawaken | 1.00 |

TABLE 1-continued

| CATALYST | | CATALYST ACTIVATION CONDITIONS | | | | | CATALYST ACTIVITY |
|---|---|---|---|---|---|---|---|
| Catalyst | Tyler Sieve size range | Activation Temperature | % NaOH (4) | NaOH addition time (3) | grams Gluconic acid per 100 grams of alloy | Comments (5) | relative to the standard basis - dimension less |
| b | 6–8 | 85 | 20 | 94 min. | 0 | Chemical Company (2) Prepare catalyst using method claimed in this invention (1) | 3.15 |
| c | 6–8 | 105 | 10 | 135 min. | 1.33 | | 4.96 |
| d | 6–8 | 105 | 10 | 381 min. | 5.32 | | 7.63 |
| e | 6–8 | 85 | 10 | 381 min. | 5.32 | | 7.82 |

FOOTNOTES FOR TABLE 1

1. The catalysts (b), (c), (d), and (e) are prepared according to the method taught in Example 1, except that the activation temperatures, per cent NaOH, NaOH addition time, and grams gluconic acid per 100 grams of alloy are varied as summarized in this Table.
2. Catalyst (a) is prepared by the method described by Kawaken Chemical Company, in which the alloy particles are incrementally added over a 1.5 hour period to an agitated solution to which all of the sodium hydroxide has been added prior to adding the alloy particles. After adding all alloy particles, the particles and sodium hydroxide are contacted for an additional 2½ to 3 hours before removing the particles from the sodium hydroxide solution and washing them free of excess caustic.
3. In all cases, 2.5 to 3.0 grams of 50% sodium hydroxide solution per gram of alloy are added to the reactor flask over the indicated NaOH addition time.
4. Percent NaOH is calculated as: $\frac{W(0.5)}{S + W}$
where W is the weight of 50% NaOH solution added to the reactor flask, and S is the weight of water initially present in the reactor flask just before starting the addition of the NaOH solution to the reaction flask.
5. Catalyst (b) is inferior to catalysts (c), (d), and (e) because of the presence of the gluconic acid during catalyst activation in catalysts (c), (d), and (e).

EXAMPLE 6

Hydrolysis process for testing catalyst life

A system for hydrolyzing acrylonitrile to acrylamide is a reactor in the design of a double pipe heat exchanger with a flow system as indicated in FIG. 2. The inner tube which constitutes the reaction zone which has a 5 foot length and is formed of 316 stainless steel and has 1" outside diameter schedule 10S pipe. The inner tube is uniformly surrounded by a jacket which is provided with an inlet at the bottom of the jacket and also with an outlet at the top of the jacket to allow circulation of a heat transfer medium to remove heat generated from the reaction. A temperature sensing device is installed in the inner pipe to allow temperature measurements throughout the reaction zone.

During operation of the reactor, acrylonitrile and water are separately pumped from volumetrically calibrated feed tanks, combined, heated and introduced into the bottom of the reactor. The reactor is maintained under pressure to allow maintaining liquid phase conditions. In this Example, the following process conditions apply to the operation in test of a catalyst prepared in the manner of Example 1, except that 0.053 grams of gluconic acid per gram of alloy are initially added to the water and approximately 4.1 grams of 50% NaOH solution are added per gram of alloy over a 5 hour period, and also except that the metal particles are not placed in a basket but are deposited on the bottom of the reaction vessel.

Reactor temperature 220° ± 2°F.
Weight percent acrylonitrile
in the feed  35 ± 1%
Weight hourly space velocity 2.0 ± 0.3 pounds of feed per pound of catalyst per hour.

As previously mentioned, the catalyst here used is a nominal 50% copper, 50% aluminum alloy activated in the manner described in this invention. A quantitative analysis of this catalyst after activation indicates that the activated catalyst composition is 81 weight percent copper and 19 weight percent aluminum. The catalyst, which is in the form of particles ranging in size from about 0.06 to 0.125 inches in diameter, is typical of other catalysts prepared as taught herein and evaluated in the process of this invention.

Product leaving the reactor is cooled before being reduced to atmospheric pressure. Such product is collected in a final receiver and analyzed for acrylamide, acrylonitrile and water content. Based on these respective analyses, conversion level of acrylamide, and activity of the catalyst at a particular point in time is determined by the method of Example 8(a–n).

The initial activity of the catalyst is determined to be 7.1. After about 500 hours of operation at the described test conditions, catalyst activity remains at 7.1, within experimental error. After approximately 1700 hours of operation at the described test conditions, the catalyst activity is determined to be 4.7.

A typical catalyst prepared in the manner of this invention, has demonstrated remarkable life along with the previously mentioned high activity. Using the hydrolysis test for determing catalyst life, a catalyst has been tested for more than 1700 continuous operating hours, during which period more than 1100 pounds of acrylamide per pound of catalyst were produced with an initial conversion level of acrylonitrile to acrylamide of about 80% and at the end of the test a final conversion level of acrylamide to acrylonitrile of about 70%.

The extremely long life of this catalyst and the small loss of catalyst activity over this period, demonstrates the superiority of this catalyst preparation method.

EXAMPLE 7 (PARTS A THROUGH R)

A series of 18 different Raney copper catalysts are prepared using the following standardized procedure.

A three liter reaction flask is provided with a nitrogen purge inlet, a buret for caustic addition, a thermometer, and a hydrogen outlet connected to a wet test meter. A basket is attached to a motor-driven agitator shaft so that the basket can be rotated inside the reaction flask during the activation procedure.

A total of 200 grams of copper/aluminum alloy particles are placed inside of the basket. The particles are between 6 and 8 Tyler mesh in size, and they are approximately 50% aluminum and 50% copper on a weight percentage basis. A total of approximately 2650 grams of deionized water and a preselected amount of an organic additive are charged to the flask. The flask is subsequently closed and purged with nitrogen to prevent forming an explosive gas mixture during activation. A total of 662 grams of a 50% by weight solution of sodium hydroxide in water are added to the flask incrementally over approximately a 4 hour period. After completing the sodium hydroxide addition, the mixture is held for an additional time period sufficient to allow a total of 4.2 to 4.7 cubic feet of hydrogen to evolve from the flask, as measured by the wet test meter. During the sodium hydroxide addition and the subsequent hold period the temperature of the liquid is maintained between 40° and 43°C. The basket containing the metal particles is rotated inside the liquid during the sodium hydroxide addition and subsequent hold period. After completing the activation procedure, the resulting Raney copper catalyst particles are washed repeatedly with water until the washings show a pH which is less than 8. Fines are removed by wet screening on a 10 Tyler mesh screen and subsequently are stored under water prior to testing for acrylonitrile hydration activity.

A total of 15 different organic additives are individually tested using the preceding procedure. The additives tested are (a) gluconic acid; (b) lactic acid; (c) malic acid; (d) malonic acid; (e) sorbitol; (f) tartaric acid; (g) glycolic acid; (h) dextrose monohydrate; (i) sucrose; (j) glycerol; (k) pentaerythritol; (l) corn starch; (m) citric acid; (n) ethylene glycol; (o) and (p) sorbitol (retested); and (q) glyceraldehyde. A blank or control catalyst test (designated (r)) is run in which no additive is added to the catalyst preparation reaction vessel. Table 2 below summarizes the results.

EXAMPLE 8 (PARTS A THROUGH R)

The 18 catalysts (17 with additives) prepared in Example 1 are each tested for acrylonitrile hydration activity by using the following standardized procedure:

A total of 80.6 grams of wet catalyst are charged to a reaction tube which has been fabricated from 2/4 inch diameter pipe. The reaction tube is immersed in a hot water bath which is used to control temperature inside the tube, as measured by thermocouples which are enclosed inside of a thermowell which projects into the reaction tube from one end.

When this reactor is used to determine activity of a catalyst, acrylonitrile and water are separately pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected and analyzed by gas chromotagraphy for weight % acrylamide, acrylonitrile, and water. From this analysis the percent conversion of acrylonitrile to acrylamide is estimated.

For each catalyst, a series of different tests are run at different contact times with all other variables held constant, as follows:

1. Arithmetic mean catalyst bed temperature of approximately 175°F.
2. Feed composition 100% basis of 25 weight % acrylonitrile and 75 weight % water.

Contact time is inversely measured as weight hourly space velocity (WHSV), which is defined as weight hourly feed rate divided by dry catalyst weight in the reaction zone.

The contact times are varied to bracket a 35% conversion of acrylonitrile to acrylamide. The WHSV required for a 35% conversion is estimated by graphical or statistical interpolation. The catalyst activity ($a$) is then calculated from the following expression:

$$a = 1.2 \, (\text{WHSV}_{35})$$

where $\text{WHSV}_{35}$ is the weight hourly space velocity required for 35% conversion of acrylonitrile to acrylamide.

The activities determined by the preceding procedure for the catalysts prepared in Example 7 are tabulated in Table 2 below and presented graphically in FIG. 5. All additives having three or more carbon-oxygen groups per molecule impart improved activity to the Raney copper catalyst when utilized at a solution concentration of 0.15%. All additives having two carbon-oxygen groups per molecule did not make catalysts having greater activity, when utilized at a solution concentration of 0.15%, than the so-called blank catalyst where no additive is used. Ethylene glycol, when utilized at a 9.5% solution concentration, did show an increase in activity over the blank catalyst made without additive, which shows that the less effective additives containing only two carbon oxygen bonds can improve catalyst activity when used at higher concentrations. With the exception of the polysaccharides, which are not shown on FIG. 5, additives with a greater number of carbon-oxygen groups per molecule generally produce catalysts with higher activities. Glyceraldehyde, however, is a notable exception in producing catalysts of much higher activity than other additives with three carbon-oxygen bonds.

TABLE 2

| Additive | Additive Level (percent based on alloy charge) | Additive Concentration in Solution* (% by Wt.) | Catalyst Activity |
|---|---|---|---|
| (a) gluconic acid | 2.5 | 0.15 | 6.2 |
| (b) lactic acid | 2.5 | 0.15 | 2.8 |
| (c) malic acid | 2.5 | 0.15 | 3.7 |
| (d) malonic acid | 2.5 | 0.15 | 3.1 |
| (e) sorbitol | 2.5 | 0.15 | 8.4 |
| (f) tartaric acid | 2.5 | 0.15 | 4.2 |
| (g) glycolic acid | 2.5 | 0.15 | 3.2 |

TABLE 2-continued

| Additive | Additive Level (percent based on alloy charge) | Additive Concentration in Solution* (% by Wt.) | Catalyst Activity |
|---|---|---|---|
| (h) dextrose monohydrate | 2.5 | 0.15 | 8.2 |
| (i) sucrose | 2.5 | 0.15 | 4.9 |
| (j) glycerol | 2.5 | 0.15 | 3.6 |
| (k) pentaerythritol | 2.5 | 0.15 | 4.4 |
| (l) corn starch | 2.5 | 0.15 | 3.8 |
| (m) citric acid | 1.25 | 0.08 | 4.3 |
| (n) ethylene glycol | 175 | 9.6 | 4.5 |
| (o) sorbitol | 75 | 4.3 | 8.3 to 11.2 |
| (p) sorbitol | 7.5 | 0.45 | 10.0 |
| (q) glyceraldehyde | 5.0 | 0.3 | 7.4 |
| (r) blank - no additive | 0 | 0 | 3.2 |

*After NaOH addition is complete, on an aluminate free basis.

EXAMPLE 9

A catalyst first is prepared in the same manner as described in Example 7 but, without adding any additive to the reaction flask prior to or during the sodium hydroxide addition period.

Then this catalyst is treated as follows: A clean reaction flask as described and equipped in Example 7 is filled with approximately 2,650 grams of deionized water, 662 grams of a 50% aqueous sodium hydroxide solution, and 10 grams of a 50% gluconic acid solution. The previously prepared Raney copper catalyst is charged into the basket which is immersed into this resulting solution and the basket is rotated in the solution for 3⅓ hours. The liquid temperature is held between the 40° and 43°C. Only 0.143 cubic feet of hydrogen are involved, as measured by a wet test meter.

The catalyst is subsequently tested for acrylonitrile hydration activity by the method of Example 8. The catalyst is found to have an activity of 4.9, which is about 50% higher than the nonadditive treated catalyst of Example 8 (r) which was prepared without any exposure to any additive with the sodium hydroxide.

EXAMPLE 10

A Raney copper catalyst is prepared using the apparatus of FIG. 3. The preparation is conducted without the use of an additive in the activating sodium hydroxide.

The system is charged with 10.5 pounds of 50% copper/50% aluminum alloy particles of 6 to 8 mesh particle size. Approximately 36 gallons of water are charged to this system, and a circulation rate of 1.5 gpm is begun through the particle bed and continues throughout the sodium hydroxide addition step period. A total of about 31 pounds of a 50% aqueous sodium hydroxide solution is subsequently added to the water at a substantially uniform rate over an 8½ hour period. The circulation is continued until about 80 to 90 weight percent of the aluminum initial present is removed, as measured by hydrogen evolution. The catalyst is then first washed over wash water until a pH of less than 8 is achieved, and subsequently is screened on a 10 mesh screen.

This catalyst is charged to the apparatus of Example 6, and is run for an extended period at the following test conditions:
Temperature: 220°F
WHSV: 1.5
acrylonitrile to water weight ratio: 35/65
Initial activity of the catalyst is determined by the procedure of Example 8 to be approximately 2.8. After about 500 hours of operation, the activity is determined by the procedure of Example 8 to have declined to 1.3.

The catalyst of Example 6, which was prepared using gluconic acid, showed no decline in activity over a 500 hour test period when similarly evaluated, and in fact retained a higher percentage of its initial activity after over 1,700 hours of operation than the non-additive treated catalyst of this example retained after only 500 hours of operation, thereby demonstrating that a more useful catalyst is obtained with the use of gluconic acid as an additive in the activation period.

The claims are:

1. In an improved process of the type wherein acrylonitrile is hydrolyzed to acrylamide under aqueous liquid phase conditions in the presence of a Raney copper catalyst, the improvement which comprises using as said Raney copper catalyst one which has been prepared by contacting particles of a metal alloy comprised of copper and aluminum with an aqueous solution which has dissolved therein on a 100 weight percent total by-product free solution basis from greater than 0 to about 25 weight percent alkali metal hydroxide and from about greater than 0 to about 25 weight percent, or the solubility limit thereof in water, whichever is lower, of at least one aliphatic hydroxylated hydrocarbon compound, said aliphatic hydroxylated hydrocarbon compound having at least two carbon atoms per molecule, and at least two groups per molecule each of which is independently selected from the class consisting of hydroxyl, carboxyl, aldehyde, alkali metal carboxylate and esterified carboxylate, at least one of said groups being hydroxyl, said contacting being conducted at a temperature of below about 80°C.

2. The process of claim 1 wherein said metal alloy is comprised of aluminum and copper in a weight percent ratio of from about 70:30 to 30:70 aluminum to copper in the form of particles ranging in size from about 0.001 to 0.5 inch.

3. The process of claim 1 wherein said Raney copper catalyst is comprised of from about 2 to 45 weight percent aluminum with the balance up to 100 weight percent thereof being copper.

4. The process of claim 1 wherein said hydrolysis process is conducted using a starting composition comprised of from about 10 to 75 weight percent acrylonitrile with the remainder up to 100 weight percent thereof being water.

5. The process of claim 4 wherein said hydrolysis process is conducted at a temperature in the range from about 60° to 150° C.

6. The process of claim 1 wherein said hydrolysis process is conducted using a starting composition containing from about 30 to 40 weight percent acrylonitrile with the remainder up to 100 weight percent thereof being water and at temperatures of from about 70° to 125° F.

7. The process of claim 1 wherein said solution comprises from greater than 0 to about 15 weight percent alkali metal hydroxide, from greater than 0 to about 5 weight percent hydroxylated hydrocarbon compound and with the balance up to 100 weight percent thereof being water.

8. The process of claim 1 wherein said solution comprises from greater than 0 to about 5 weight percent alkali metal hydroxide, from about 0.01 to about 1.0 weight percent hydroxylated hydrocarbon compound, and with the balance up to 100 weight percent thereof being water.

9. The process of claim 1 wherein at least about 25 weight percent of the initially present aluminum in said alloy particles is removed during said contacting.

10. The process of claim 1 wherein said contacting is conducted for a time ranging from about ½ to 30 hours.

11. The process of claim 1 wherein before said contacting with said solution said alloy is preliminarily contacted with a preliminary composition which comprises an aqueous solution of at least one hydroxylated hydrocarbon compound.

12. The process of claim 11 wherein said preliminary composition comprises from greater than 0 to about 25 weight percent hydroxylated hydrocarbon compound with the balance up to 100 weight percent on a total composition basis being water.

13. The process of claim 11 wherein said preliminary composition comprises from greater than 0 to about 5 weight percent hydroxylated hydrocarbon compound with the balance up to 100 weight percent on a total composition basis being water.

14. The process of claim 1 wherein said Raney copper catalyst is in the form of particles at least 90 weight percent of which range in average size from about 0.002 to 0.100 inch, which particles are suspended in the reactants.

15. The process of claim 1 wherein said Raney copper catalyst is in the form of particles at least 90 weight percent of which range in average size from about 0.02 to 0.5 inch which particles are in the form of a fixed bed over and through which the reactants are passed.

16. An improved process for making acrylamide from acrylonitrile comprising the steps of:
A. activating a Raney copper catalyst through contact of aqueous alkali metal hydroxide with a metal alloy in particulate form and comprised of copper and aluminum thereby to remove from such allow particles at least about 25 weight percent of the aluminum initially present therein, at least a portion of such contacting being conducted over a time interval of from ½ to 30 hours using an aqueous alkali metal hydroxide solution which additionally has dissolved therein a hydroxylated hydrocarbon compound, said hydroxylated hydrocarbon compound having at least three carbon atoms per molecule, and at least three groups per molecule each of which is independently selected from the class consisting of hydroxyl, carboxyl, aldehyde, alkali metal carboxylate and esterified carboxylate, at least one of said groups being hydroxyl, B contacting the so activated Raney copper catalyst with an aqueous composition comprising from about 10 to 75 weight percent acrylonitrile with the remainder up to 100 weight percent thereof being water while maintaining a temperature of from about 60° to 150°C thereby to hydrolyze at least a portion of said acrylonitrile to acrylamide.

17. In a process for catalytically hydrolyzing acrylonitrile to acrylamide by contacting acrylonitrile in the presence of water with a Raney copper catalyst, the improvement which comprises the steps of:
A. first contacting an aqueous solution of a hydroxylated hydrocarbon compound with a group of metal alloy particles comprised of copper and aluminum, said hydroxylated hydrocarbon compound having at least three carbon atoms per molecule, and at least three groups per molecule each of which is independently selected from the class consisting of hydroxyl, carboxyl, aldehyde, alkali metal carboxylate and esterified carboxylate, at least one of said groups being hydroxyl,
  1. said solution containing from about 0.01 to 1 weight percent of said hydroxylated hydrocarbon compound in dissolved form,
  2. said group having an average particle size diameter in the range from about 0.001 to 0.5 inch,
  3. said alloy having a copper to aluminum weight ratio of from about 30:70 to 70:30,
  4. said solution having a temperature in the range from about 0° to 80° C,
B. secondly contacting the resulting said group of alloy particles with an aqueous caustic solution,
  1. said aqueous caustic solution containing from greater than 0 to about 5 weight percent dissolved alkali metal hydroxide,
  2. said contacting being accomplished over a total time interval of from about ½ to 30 hours,
  3. said caustic solution being added gradually to said group over said time interval,
  4. the contact rate of starting caustic solution being added to said group during such contacting being from about 0.01 to 10 pounds caustic per pound of said starting group of alloy particles per hour,
  5. the total quantity of caustic so added being in the range of from about 0.5 to 25 pounds of caustic per pound of said starting group of particles,
  6. said aqueous caustic solution and the resulting aqueous medium produced in such contacting each having a temperature in the range from about 0° to 80° C,
  7. said group being maintained in said contact with said solution of said hydroxylated hydrocarbon compound during said contacting with said aqueous caustic solution by admixture of such respective solutions,
C. washing the so-treated group of product particles to separate therefrom remaining unreacted caustic, and
D. thirdly contacting at a temperature of from about 60° to 150° C the so-washed group of particles with an aqueous composition comprising from about 10 to 75 weight percent acrylonitrile with the remainder to 100 weight percent thereof being water.

18. The process of claim 6 wherein time interval of said second contacting ranges from about 4 to 12 hours.

19. The process of claim 17 wherein said group of particles is confined to a reaction zone and said caustic solution is added into said reaction zone and said resulting medium is allowed to accumulate in said zone.

20. The process of claim 19 wherein said group of particles is initially wet with water.

21. The process of claim 19 wherein said group of particles is initially substantially free from water.

22. The process of claim 20 wherein said group of particles is immersed in water.

23. The process of claim 16 wherein said group of particles is confined to a reaction zone, and said caustic solution is first contacted with said group of particles in said zone and said resulting medium is gradually removed from said zone.

24. The process of claim 23 wherein said resulting medium is so removed at a volumetric rate which is about equal to the rate of addition of said caustic solution.

25. The process of claim 23 wherein substantially 100 weight percent of said so removed, resulting medium is recycled back into contact with said group of particles.

26. The process of claim 25 wherein said so recycled medium is admixed with at least a portion of said caustic solution before or during recycle contact with said group of particles.

27. The process of claim 23 wherein less than 100 weight percent of said so removed, resulting medium is recycled back into contact with said group of particles and the balance up to 100 weight percent thereof remains removed from said reaction zone.

28. The process of claim 16 wherein said hydroxylated hydrocarbon compound is polyhydroxylated aliphatic carboxylic acid.

29. The process of claim 28 wherein said acid is characterized by the formula:

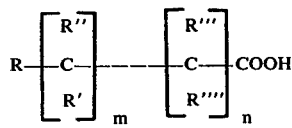

wherein:
R,R',R'',R''' and R'''' are each independently H, lower alkyl, OH, or COOH, provided that at least one of R,R', R'', R''' and R'''' is hydroxyl and that at least one other of such R, R', R'', R''' and R'''' groups is either carboxyl or hydroxyl,
n is an integer of from 2 through 8, and
m is an integer from 0 through 4.

30. The process of claim 16 wherein said hydroxylated hydrocarbon compound is characterized by the formula:

$$R - (CHOH)_n - COOH$$

wherein R is selected from the group consisting of $CH_3$, $CH_2OH$, COOH, CHO and —H, and
n is an integer of from 1 through 5.

31. The process of claim 16 wherein hydroxylated hydrocarbon compound is characterized by the formula:

$$H-(CHOH)_n - CH_2OH$$

wherein n is an integer of from 3 through 8.

32. The process of claim 16 wherein hydroxylated hydrocarbon compound is a saccharide or glycoside.

33. The process of claim 1 wherein said hydroxylated hydrocarbon compound is selected from the group consisting of gluconic acid, its alkali metal and ammonium salts, and esters thereof.

34. The process of claim 1 wherein said hydroxylated hydrocarbon compound is dextrose.

35. The process of claim 1 wherein said hydroxylated hydrocarbon compound is selected from the group consisting of sorbitol and mannitol.

* * * * *

UNITED STATES PATENT AND TRADEMARK OFFICE
CERTIFICATE OF CORRECTION

PATENT NO. : 3,943,171
DATED : March 9, 1976
INVENTOR(S) : Karl H. Hoffmann and Donald R. Anderson It is certified that error appears in the above-identified patent and that said Letters Patent are hereby corrected as shown below:

Please correct the above identified patent as follows:

Column 2, line 38, please correct the word "indendantly" to --independantly--.

Column 5, line 32, please correct the word "porcess" to --process--.

Column 7, line 17, please correct the word "with" to --which--.

Column 20, line 47, please change "9.5%" to --9.6%.

Signed and Sealed this

Thirtieth Day of November 1976

[SEAL]

Attest:

RUTH C. MASON
Attesting Officer

C. MARSHALL DANN
Commissioner of Patents and Trademarks